(12) United States Patent
Sajassi

(10) Patent No.: US 10,250,552 B1
(45) Date of Patent: Apr. 2, 2019

(54) L3VPN SERVICE WITH SINGLE IGP/BGP SESSION FROM A MULTI-HOMED CE WITH FAST CONVERGENCE USING EVPN

(71) Applicant: CISCO TECHNOLOGY, INC., San Jose, CA (US)

(72) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 15/198,541

(22) Filed: Jun. 30, 2016

Related U.S. Application Data

(60) Provisional application No. 62/328,418, filed on Apr. 27, 2016.

(51) Int. Cl.
*H04L 12/26* (2006.01)
*H04L 29/08* (2006.01)
*H04L 29/12* (2006.01)

(52) U.S. Cl.
CPC ........ *H04L 61/103* (2013.01); *H04L 43/0817* (2013.01); *H04L 61/305* (2013.01); *H04L 67/146* (2013.01); *H04L 67/16* (2013.01)

(58) Field of Classification Search
CPC .............................. H04W 72/04; H04L 12/26
USPC .................................................. 370/225–401
See application file for complete search history.

(56) References Cited

U.S. PATENT DOCUMENTS

| | | | |
|---|---|---|---|
| 9,363,102 B1 * | 6/2016 | Brandwine | ......... H04L 12/4633 |
| 2017/0195210 A1 * | 7/2017 | Jacob | ................. H04L 12/4625 |
| 2017/0272792 A1 * | 9/2017 | Bachmutsky | ...... H04N 21/2181 |

OTHER PUBLICATIONS

Bashandy, A., et al., "BGP Prefix Independent Convergence," Network Working Group, Internet Draft, Oct. 21, 2013, 20 pages; https://tools.ietf.org/pdf/draft-rtgwg-bgp-pic-02.pdf.

(Continued)

*Primary Examiner* — Iqbal Zaidi

(57) ABSTRACT

Various embodiments of the present disclosure discuss how EVPN can be used to offer a multi-homed L3VPN service leveraging its Layer 2 access redundancy. The solution offers single IP peering to the Customer Edge (CE) nodes, rapid failure detection, minimal fail-over time and make-before-break paradigm for maintenance.

20 Claims, 8 Drawing Sheets

(56) References Cited

OTHER PUBLICATIONS

Sajassi, A., et al., "Integrated Routing and Bridging in EVPN" L2VPN Workgroup, Internet-Draft, Oct. 18, 2015, 26 pages; https://tools.ietf.org/pdf/draft-ietf-bess-evpn-inter-subnet-forwarding-00.pdf.
Rabadan, J., et al., "IP Prefix Advertisement in EVPN," IETF91, Nov. 2014, 6 pages; https://www.ietf.org/proceedings/91/slides/slides-91-bess-8.pdf.
Sajassi, A., et al., "Multi-homed L3VPN Service with Single IP peer to CE," BESS Workgroup, Internet-Draft, Oct. 19, 2015, 8 pages.
Sajassi, A., et al., "Multi-homed L3VPN Service with Single IP peer to CE," BESS Workgroup, Internet-Draft, Mar. 21, 2015, 9 pages; https://tools.ieff.org/pdf/draft-sajassi-bess-evpn-l3vpn-multihoming-01.pdf.
"PE-to-CE Design Options," Cisco Enterprise L3 Virtualization, Design and Implementation Guide, Dec. 1, 2014, 31 pages.
Muley, P., et al., "Pseudowire Redundancy," Internet Engineering Task Force (IETF), RFC 6718, Aug. 2012, 18 pages; https://www.rfc editor.org/rfc/pdfrfc/rfc6718.txt.pdf.
Muley, P., et al., "Pseudowire Preferential Forwarding Status Bit," Internet Engineering Task Force (IETF), RFC 6870, Feb. 2013, 35 pages; https://www.rfc-editor.org/rfc/pdfrfc/rfc6870.txt.pdf.
Sajassi, E., et al., "BGP MPLS-Based Ethernet VPN," Internet Engineering Task Force (IETF), RFC 7432, Feb. 2015, 56 pages; https://www.rfc-editor.org/rfc/pdfrfc/rfc7432.txt.pdf.

\* cited by examiner

US 10,250,552 B1

L3VPN SERVICE WITH SINGLE IGP/BGP SESSION FROM A MULTI-HOMED CE WITH FAST CONVERGENCE USING EVPN

CROSS-REFERENCE TO RELATED APPLICATIONS

This application claims the benefit of and priority from U.S. Provisional Patent Application Ser. No. 62/328,418 filed 27 Apr. 2016 entitled "L3VPN SERVICE WITH SINGLE IGP/BGP SESSION FROM A MULTI-HOMED CE WITH FAST CONVERGENCE USING EVPN," which is incorporated herein by reference in its entirety.

TECHNICAL FIELD

This disclosure relates in general to the field of communications and, more particularly, to methods and systems for using Ethernet Virtual Private Network (EVPN) to offer a multi-homed Layer 3 Virtual Private Network (L3VPN) service leveraging EVPN Layer 2 access redundancy.

BACKGROUND

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

RFC 7432 ("BGP MPLS-Based Ethernet VPN") defines Ethernet VPN (EVPN), a solution for multipoint Layer 2 Virtual Private Network (L2VPN) services, with advanced multi-homing capabilities, using Border Gateway Protocol (BGP) for distributing customer/client Media Access Control (MAC) address (C-MAC) reachability information over the core Multi-Protocol Label Switching (MPLS)/Internet Protocol (IP) network. EVPN with Integrated Routing and Bridging (IRB) and EVPN-prefix solutions discuss how EVPN can be used to support inter-subnet forwarding among hosts across different IP subnets, while maintaining the redundancy capabilities of the original solution.

Service providers are in the process of designing their next generation converged network and they want to provide a new L3VPN service with the following criteria: a customer edge (CE) device is supported by a provider edge (PE) pool of two or more PE devices, there is only one Interior Gateway Protocol (IGP)/BGP session from the CE device, non-stop forwarding from the CE device with very little packet loss upon failure of the primary PE device, and fast convergence on the remote PE devices with very little packet loss upon failure of the primary PE device. A solution that can address at least some of these requirements would be desirable.

BRIEF DESCRIPTION OF THE DRAWINGS

To provide a more complete understanding of the present disclosure and features and advantages thereof, reference is made to the following description, taken in conjunction with the accompanying FIGUREs, wherein like reference numerals represent like parts, in which.

DETAILED DESCRIPTION OF EXAMPLE EMBODIMENTS

Overview

Figure 1:
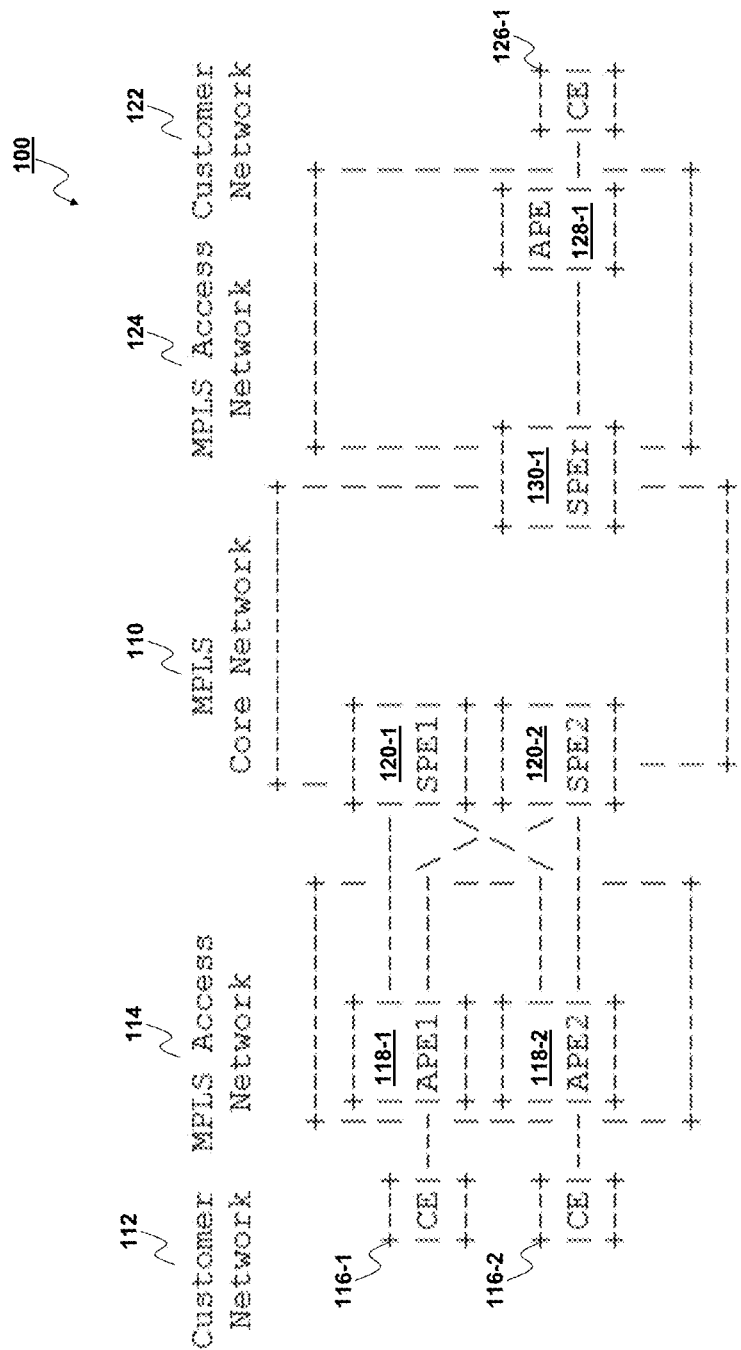
FIG. 1 illustrates a schematic block diagram of an example network environment, according to some embodiments of the present disclosure.

Various embodiments of the present disclosure discuss how EVPN can be used to offer a multi-homed L3VPN service leveraging its Layer 2 access redundancy. The solution offers single IP peering to the Customer Edge (CE) nodes, rapid failure detection, minimal fail-over time and make-before-break paradigm for maintenance.

In one aspect, embodiments presented herein relate to a computer-implemented method for assisting provision of a multi-homed L3VPN service for a CE device multi-homed to a plurality of provider edge (PE) devices and operating in a single-active redundancy mode. The method may include establishing a communication session between said CE device and a provider edge (PE) device elected, out of said plurality of PE devices, to be a single designated forwarder (DF) for said CE device (DF PE device), receiving at said DF PE device from said CE device, over said communication session, one or more messages comprising host Internet Protocol (IP) prefixes of hosts reachable via said CE device; and sending, by said DF PE device, one or more route advertisement messages advertising the host IP prefixes received at said DF PE device from said CE device, each route advertisement message comprising an indication of said CE device (thus providing an indication that said host IP prefixes contained in the route advertisement messages are for hosts reachable via said CE device).

A functional entity performing embodiments of the methods described herein may be referred to in the following as a "L3VPN service system" (where the word "system" does not imply or limit its implementation to a system). Such a functional entity could be implemented within any network element or distributed among a plurality of network elements associated with multi-homed EVPN networks, e.g. in PE devices (sometimes interchangeably referred to as "PE nodes").

As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

As will be appreciated by one skilled in the art, aspects of the present disclosure, in particular the functionality related to various aspects of assisting provision of a multi-homed L3VPN service using EVPN described herein, may be embodied in various manners. Accordingly, other aspects of the present disclosure relate to systems, computer programs, mechanisms, and means for carrying out the methods according to various embodiments described herein. Such systems, computer programs, mechanisms, and means could be included within various network devices, such as e.g. switches and routers, in particular within PE devices. A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to data structures for assisting provision of a multi-homed L3VPN service using EVPN, e.g. data structures configured to carry various indications described herein.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Network Environment: Basics of Multi-Homed EVPN Networks

For purposes of illustrating the techniques for assisting provision of a multi-homed L3VPN service using EVPN, described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

As previously described herein, a computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

A service provider network can provide service to customer networks via Provider Edge (PE) devices (e.g. routers or switches) that are located at the edge of the service provider network. In some cases, each PE device may be connected directly to a Customer Edge (CE) device (e.g. host, router or switch) located at the edge of a customer network. In other cases, an Access Network (AN) may provide connectivity (via Ethernet Virtual Circuits (EVC)) in order to interconnect PE and CE devices.

As used herein, the term "CE device/node" or simply "CE" refers to a customer device or a customer network. EVPN can support single-homed devices, single-homed networks, multi-homed devices and multi-homed networks. A CE multi-homed device or a CE multi-homed network can tolerate certain network failures because the connection to two or more PE devices provides additional redundancy. In the case where a CE device is multi-homed to two or more PE devices, the set of Ethernet links between the CE device and the PE devices provides additional redundancy. In the case where a CE device is multi-homed to two or more PE devices, the set of Ethernet links between the CE device and the PE devices constitutes an Ethernet Segment (ES) having a certain ES identifier (ESI).

When a CE is multi-homed, i.e. it is, or may be, connected to more than one PE, there are two redundancy modes of operation and the two or more PEs to which a CE is connected are referred to, collectively, as a "Redundancy Group". In an all-active mode, all of the PEs attached to a particular ES are allowed to forward traffic to/from that ES. In a single-active mode, only a single PE (the designated forwarder, sometimes abbreviated as "DF"), among a group of PEs attached to a ES, is allowed to forward traffic to/from the ES.

In some instances, the AN can be an Ethernet Access Network (EAN) that can support EVCs by utilizing encapsulations as described in IEEE 802.1Q "Virtual LANs" protocol, included herein in its entirety. Alternatively, the AN can be a IP or a MPLS network that can support EVCs by utilizing Ethernet over IP encapsulation or Ethernet over MPLS encapsulation, respectively.

The PE devices in a service provider network may be connected by an MPLS infrastructure that provides benefits such as fast-reroute and resiliency. The PE devices may also be connected by an IP infrastructure that utilizes Generic Routing Encapsulation (GRE) tunneling or other IP tunneling between the PE devices.

FIG. 1 illustrates a network topology as described above. As shown in FIG. 1, a network 100 may be considered to include an MPLS core network 110 providing connectivity between two or more customer networks, shown in the example of FIG. 1 with a customer network 112 and a customer network 122. In the example of FIG. 1, each of the customer networks 112, 122 is connected to the MPLS core network 110 via a respective AN, shown in FIG. 1 as an MPLS access network 114 connecting the customer network 112 and as an MPLS access network 124 connecting the customer network 122. Each of the customer networks 112, 122 may include a plurality of hosts which may connect to the respective MPLS access network 114, 124 via CE devices/nodes, shown in the example of FIG. 1 as two CE devices 116-1 and 116-2 for the customer network 112 and as one CE device 126-1 for the customer network 122. Hosts in the customer networks are not shown in FIG. 1.

Each of the ANs 114, 124 may include Access PE devices (APEs) and MPLS P nodes, shown in the Example of FIG. 1 as APEs 118-1 and 118-2 in the MPLS AN 114 and one APE 12801 in the MPLS AN 124. MPLS P nodes are not shown in FIG. 1 for simplicity. The APEs provide a Virtual Private Wire Service (VPWS) to the connected CEs using Ethernet over MPLS (EoMPLS) pseudowires per RFC 5462 ("Multiprotocol Label Switching (MPLS) Label Stack Entry: "EXP" Field Renamed to "Traffic Class" Field"), included herein in its entirety. The access pseudowires terminate on the service PE devices, shown in the example of FIG. 1 as two PE devices SPE1 120-1 and SPE2 120-2 on the side of the customer network 112 and one PE device SPEr 130-1 on the side of the customer network 122. The service PEs provide inter-subnet forwarding between the CEs, i.e. L3VPN service between them. To provide redundancy, pseudowires from a given APE can terminate on two or more SPEs forming a Redundancy Group. This provides multi-homed interconnect of APEs, and therefore their corresponding CE1, to SPEs. For example, service PE devices SPE1 and SPE2 form a Redundancy Group in that each of CE devices 116 may be connected to both of them.

A person of ordinary skill in the art will recognize that the topology illustrated in FIG. 1 is only one example and that, in other implementations, any other number of customer networks, CE devices within each customer network, and PE devices within MPLS networks may be used. Furthermore, the letter "r" in context of PE device SPEr 130-1 merely indicates that, in this and some following illustrative examples PE devices on the side of the customer network 112 are considered "local" and PE devices on the side of the customer network 122 are considered "remote."

Challenges with L3VPN Multi-Homing

EVPN is a layer 2 VPN technology built over a Packet Switched Network (PSN) (e.g. utilizing an MPLS/IP infrastructure). An EVPN instance includes CE devices that are connected to PE devices that form the edge of the MPLS infrastructure. An EVPN instance can include one or more broadcast domains (e.g. one or more VLANs) that are assigned to a given EVPN instance by the provider of the EVPN service. The PE devices provide virtual layer 2 bridged connectivity between the CE devices. A service provider network can include multiple EVPN instances. EVPN provides advanced multi-homing capabilities and uses Border Gateway Protocol (BGP) to distribute customer MAC address information over the core MPLS network. In addition, as previously described herein, EVPN with Integrated Routing and Bridging (IRB) and EVPN-prefix solutions discuss how EVPN can be used to support inter-subnet forwarding among hosts across different IP subnets, while maintaining the redundancy capabilities of the original solution, thus leveraging EVPN L2 access redundancy to offer a multi-homed L3VPN service.

In current L3VPN solutions, a multi-homed CE device has an individual external BGP (eBGP) session with each PE of its Redundancy Group. For the example shown in FIG. 1, this means that e.g. CE 116-1 would have one eBGP session with SPE1 120-1 and another eBGP session with SPE2 120-2. In this manner, each of the SPE1 and SPE2 can learn the routes to the hosts connected to the CE 116-1 and forward communications to those hosts from hosts behind other CEs. In such a case, if communication with e.g. the SPE1 fails for any reason, the SPE2 may deliver fast convergence because it has already learned all of the routes to the hosts of CE 116-1 as well.

However, there are a number of reasons why having individual eBGP sessions as described above is not the most optimal solution. It would be desirable that a CE device would only have to have a single eBGP session. In addition, it is desirable to have a solution that can support a number of further requirements. One is that the SPEs in a redundancy group can provide single-active redundancy to the CEs, i.e. only one SPE is actively forwarding traffic at any given point of time. Another requirement is that the SPEs in a redundancy group can appear as a single IP peer to the CE (e.g. that SPE1 and SPE2 would appear as a single IP peer to e.g. CE 116-1). A third requirement is that, in the case of SPE failure, pseudowire failure, or SPE isolation from access network, the fail-over time should be minimized by optimizing both the backup pseudowire establishment as well as the BGP convergence time, thus reducing the amount of traffic loss as the active path reroutes to one of the backup SPEs. Still further requirements include ability of the active SPE to quickly detect pseudowire failures or its isolation from the access MPLS network by means of a proactive monitoring mechanism, and, for system maintenance, ability to support a make-before-break paradigm, where the backup path is in warm standby state before a given active SPE is taken offline for service.

The requirements specified above, especially the requirement to maintain a single eBGP session between the CE and the SPEs, introduce challenges for standard L3VPN multi-homing solutions. In particular, the BGP prefix independent convergence (PIC) solution (BGP-PIC) cannot be used here because the backup SPEs have no means of learning the IP prefixes from the CE when a CE will only have an active eBGP session with the active SPE. As a result, when the primary SPE fails, the backup SPE(s) will have no alternate paths to the prefixes advertised by the CE and would have to learn those prefixes all over again, taking up valuable time and bandwidth. Therefore, with BGP PIC it is not possible to address the fast fail-over requirement.

Proposed Solution

Figure 2:
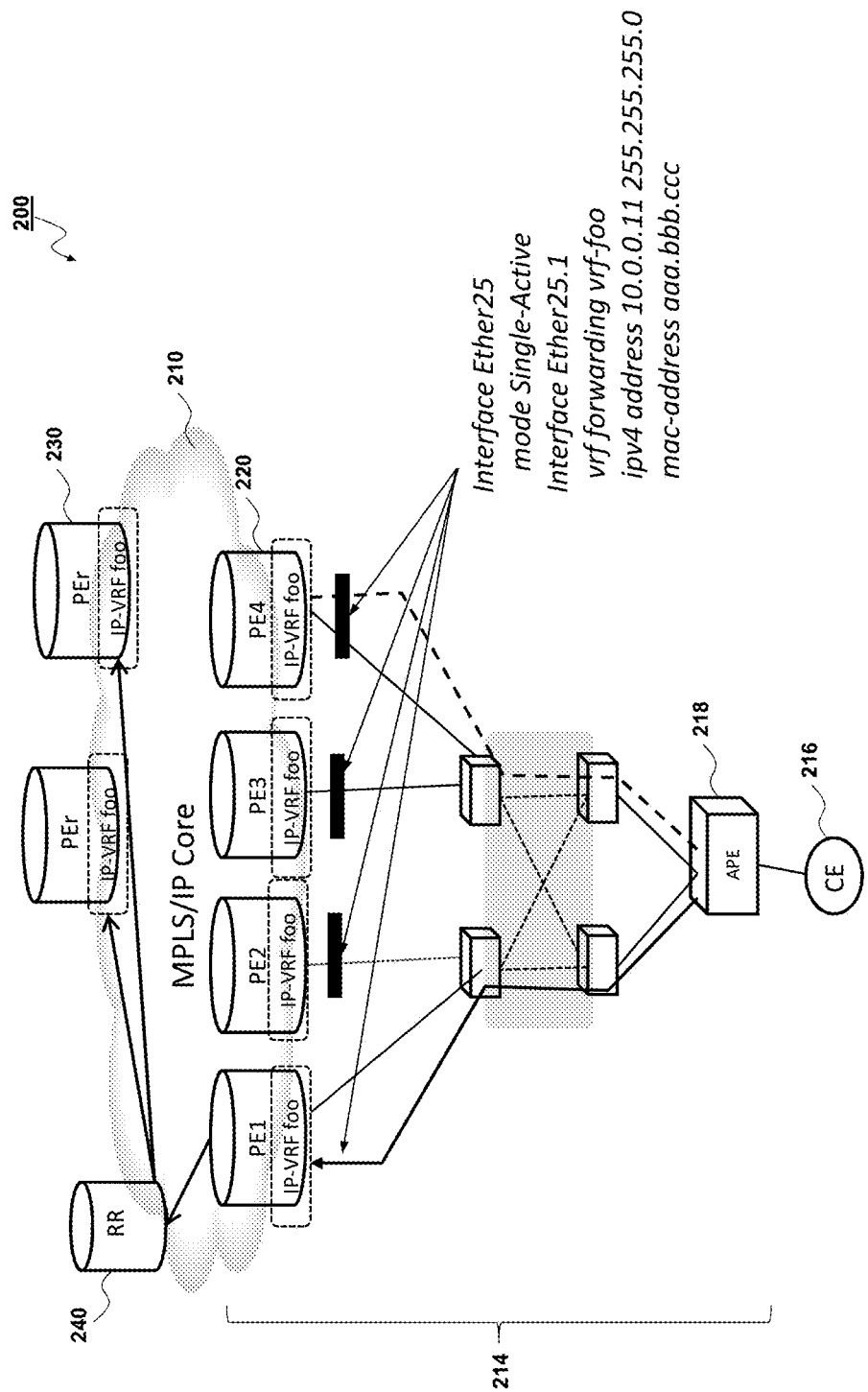
FIG. 2 illustrates use of EVPN L3 mode with single-active redundancy, according to some embodiments of the present disclosure.
Figure 3:
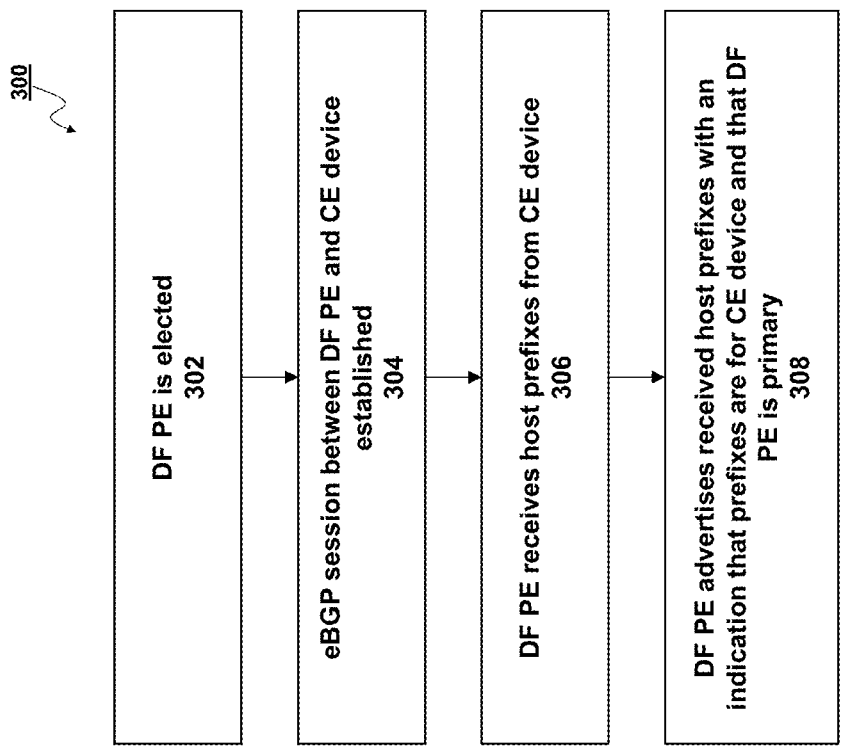
FIG. 3 is a flow diagram of a method for assisting provision of an L3VPN service using EVPN from a perspective of a DF Service PE (SPE), according to some embodiments of the present disclosure.
Figure 4:
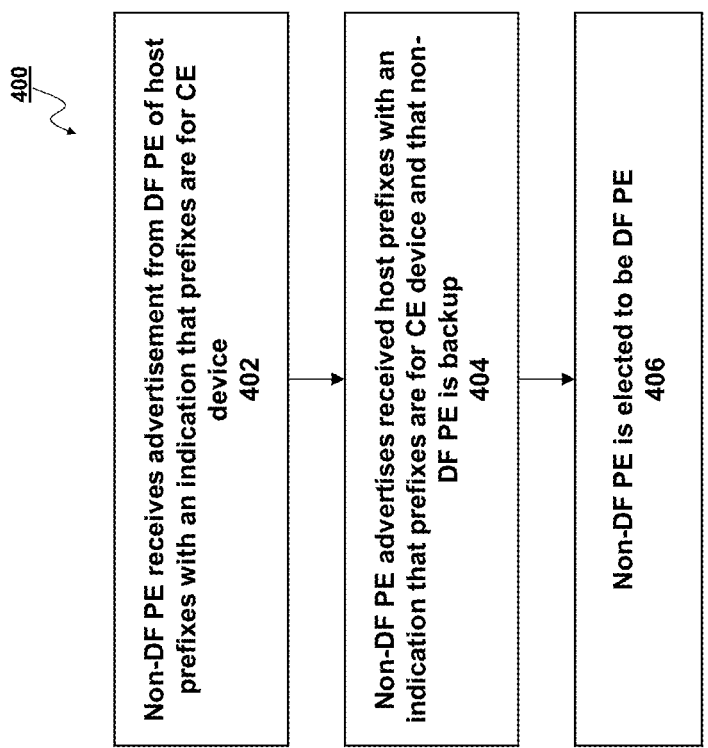
FIG. 4 is a flow diagram of a method for assisting provision of an L3VPN service using EVPN from a perspective of a backup SPE, according to some embodiments of the present disclosure.
Figure 5:
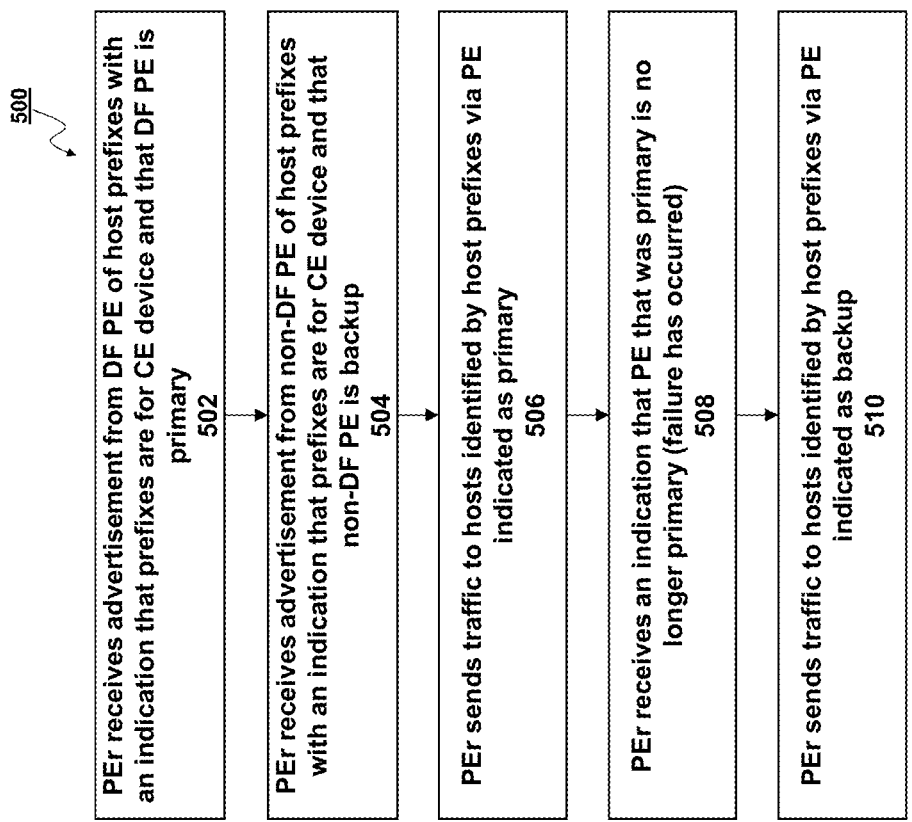
FIG. 5 is a flow diagram of a method for assisting provision of an L3VPN service using EVPN from a perspective of a remote PE, according to some embodiments of the present disclosure.
Figure 6:
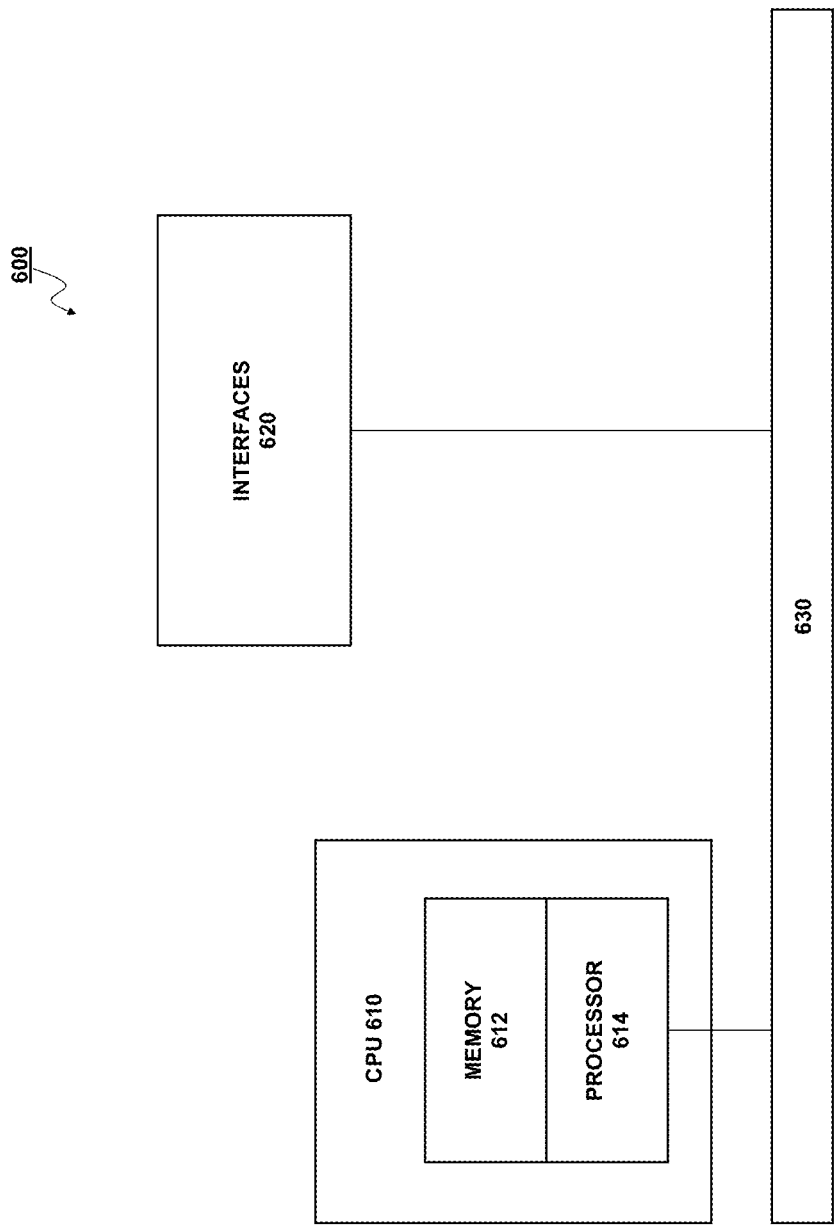
FIG. 6 illustrates an example network device suitable for implementing various embodiments of the present disclosure.
Figure 7:
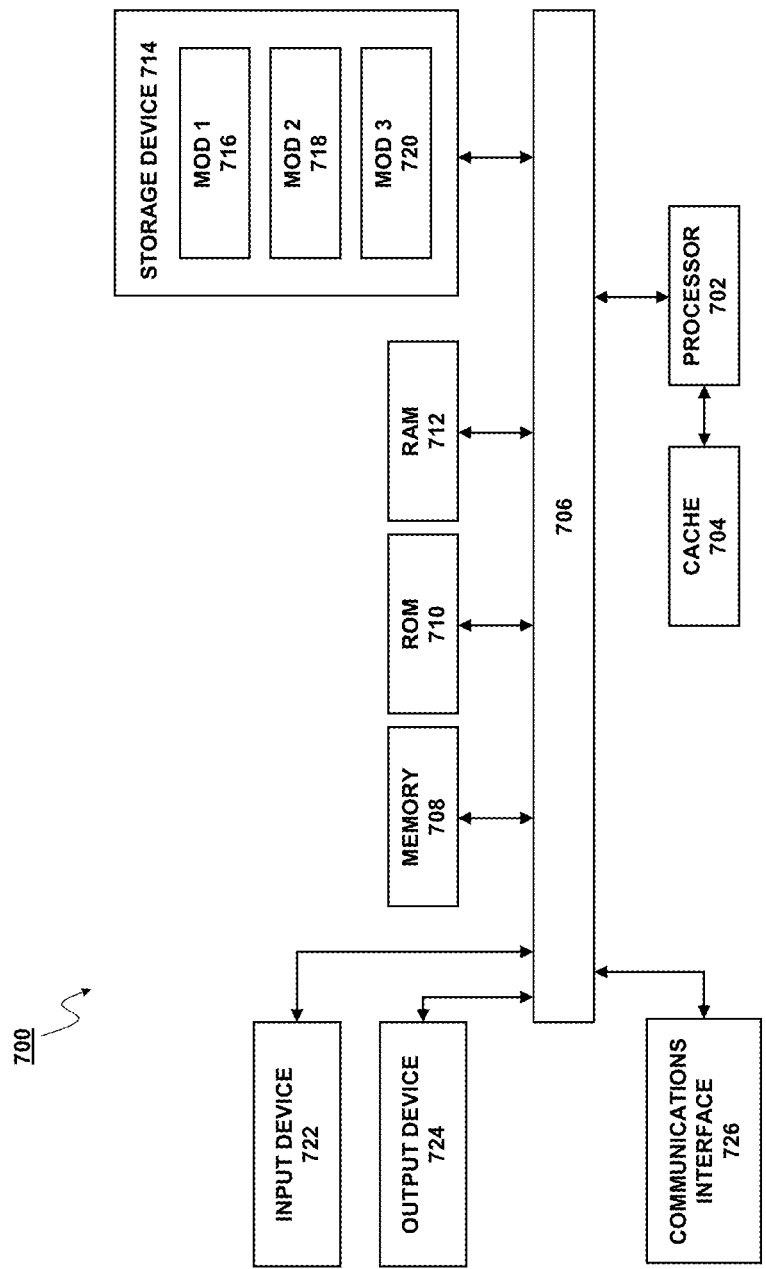
FIGS. 7 and 8 illustrate example systems, according to some embodiments of the present disclosure.
Figure 8:
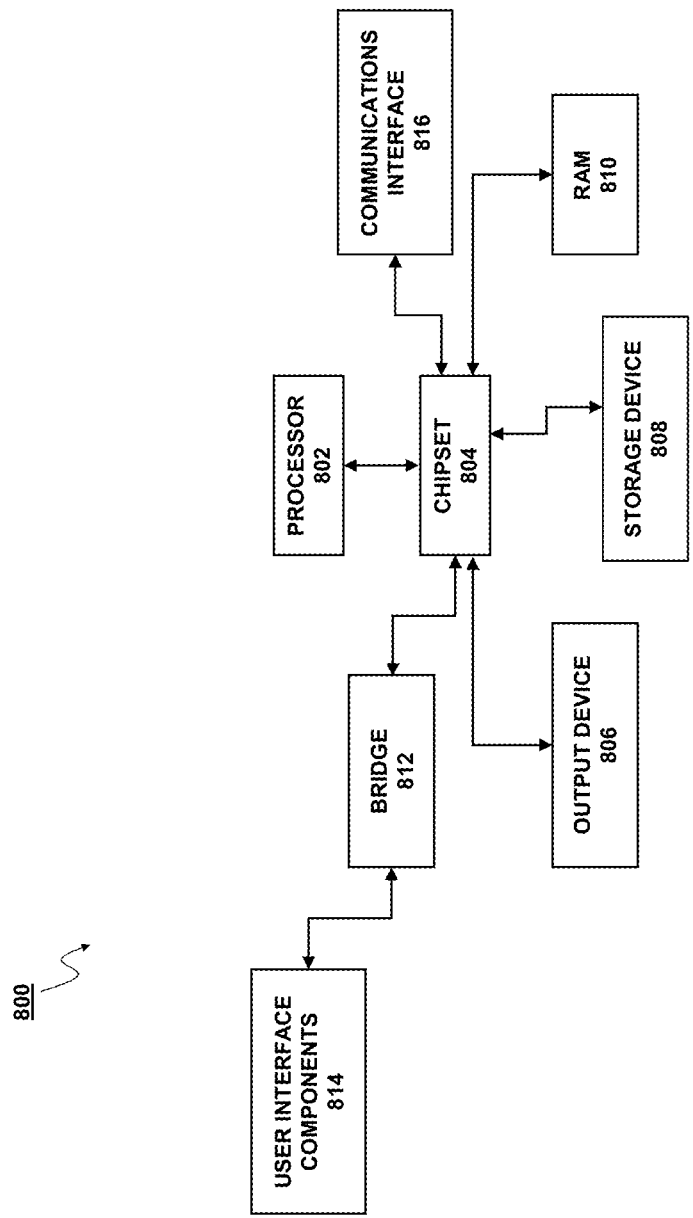

Some of the techniques described herein address the need in the art for providing an L3VPN multi-homing solution where there is only a single eBGP session at the CE. Some of the techniques described herein also address other requirements discussed above, such as e.g. a redundancy group appearing as a single IP peer to a CE, fast convergence in case of a failure, etc. Disclosed are systems, methods, and computer-readable storage media for assisting provision of an improved multi-homed L3VPN service. A description of an exemplary network environment, as illustrated in FIG. 2, is first disclosed herein. A discussion of a functionality of an L3VPN service system proposed herein will then follow, including examples and variations of methods performed by various nodes of the L3VPN service system in accordance with embodiments of the present disclosure as illustrated in FIGS. 3-5. The discussion concludes with a brief description of example devices, as illustrated in FIGS. 6-8. These variations shall be described herein as the various embodiments are set forth. The disclosure now turns to FIG. 2.

FIG. 2 illustrates use of EVPN L3 mode with single-active redundancy, according to some embodiments of the present disclosure. FIG. 2 may be considered to be an alternative representation of the network 100 shown in FIG. 1 in that analogous elements are shown in both FIGUREs. These analogous elements are given similar reference numerals in these FIGUREs. For example, reference numerals 110 in FIGS. 1 and 210 in FIG. 2 refer to an MPLS core network, reference numerals 116 in FIGS. 1 and 216 in FIG. 2 refer to a CE connected to a Redundancy Group of multiple PEs, reference numerals 118 in FIGS. 1 and 218 in FIG. 2 refer to an APE connecting the CE to the MPLS core network, reference numerals 120 in FIGS. 1 and 220 in FIG. 2 refer to different instances of a PE within a Redundancy Group (in FIG. 2, different instances of PEs 220 are differentiated as PE1, PE2, PE3, and PE4), etc. Unless specified otherwise, discussions provided for these elements in association with one of the FIGS. 1 and 2 are applicable to the other FIGURE.

FIG. 2 illustrates a schematic block diagram of an example network environment of a service provider network 200 including nodes/devices interconnected by various methods of communication. Elements of FIG. 2 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 2 are depicted with communication lines traversing the network environment 200.

In the network environment 200, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

The network 200 can include any number of provider edge (PE) devices, shown in FIG. 2 as four devices—PE1, PE2, PE3, and PE4, all indicated with a single reference numeral 220 in order to not clutter the drawing. The network 200 can also include any number of Customer Edge (CE) devices, shown in FIG. 2 as a single device CE 216. A CE device may be a host, a router, or a switch. The CE 216 is multi-homed in that it may be connected to more than one SPE, namely to SPEs PE1-PE4. The solution involves running EVPN on the SPEs in single-active redundancy mode albeit for inter-subnet forwarding (i.e. Layer 3 forwarding). All pseudowires associated with a given CE, e.g. pseudowires from the CE 216 to each of the PE1-PE4, are considered collectively as a Virtual Ethernet Segment (vES) [Virtual-ES], identified by a certain ES indicator (ESI), from the EVPN PEs perspective. As used herein, the term "pseudowire" refers to a link, e.g. an Ethernet link, communicatively connecting a CE to a particular PE so that data may be exchanged between these entities. In a single-active mode, only the Designated Forwarder SPE attached to a CE multi-homed device is allowed to forward traffic to/from that customer device, i.e. only a single SPE is primary in that it is active and is forwarding data while the other SPEs are backup SPEs.

One or more client/customer devices/hosts (not shown in FIG. 2), collectively referred to as hosts, may be connected to each CE device. Each of such hosts has access to the SPE nodes through their corresponding local CE device.

Those skilled in the art will recognize that the number of devices shown and the specific configuration shown in the service provider network 200 is for illustrative purposes and does not limit the present technology. Network environments that include additional and/or different components and connections are contemplated herein and are within the scope of the present disclosure.

In the MPLS access network, pseudowire redundancy mechanisms may be used in accordance with RFC 6718 ("Pseudowire redundancy") and RFC 6870 ("Pseudowire Preferential Forwarding Status Bit"), each of which is incorporated herein in its entirety, in either the Independent mode or the Master/Slave mode, with the SPEs acting as the Master. The EVPN Designated Forwarder (DF) election mechanism may be used to identify active (also interchangeably referred to as "primary") and standby (also interchangeably referred to as "backup") SPEs. For example, consider that PE1 shown in FIG. 2 is initially elected as the active standby SPE, illustrated in FIG. 2 with black blocks being provided at the interfaces to PE2-PE4. One or more VLANs can be carried by a single pseudowire (i.e. by a single SPE). All VLANs on primary pseudowire (i.e. on the primary SPE) will also have DF status.

The pseudowire Preferential Forwarding Status Bit as described in RFC 6870, for the access pseudowires, may be derived from the outcome of the DF election, as follows:

The SPE that is elected as DF (i.e. active SPE) for a given vES is configured to advertise "Active" in the Preferential Forwarding Status bit over the pseudowire corresponding to the vES, The SPE that is elected as non-DF (i.e. a secondary SPE) for a given vES is configured to advertise "Standby" in the Preferential Forwarding Status bit over the pseudowire corresponding to the vES.

Since only one of the SPEs (PE1 in the example considered above) is the DF, only one SPE (i.e. the DF PE1) establishes an eBGP session with the CE 216 and receives control and data traffic from the CE 216. In other words, since only the DF SPE has its access pseudowire in Active state, only that device would establish an eBGP session with the CE and receive control and data traffic. In addition, according to embodiments of the present disclosure, the DF SPE is configured to advertise host prefixes that it receives from the CE 216 over the established eBGP session, to other PEs in the EVI using EVPN route type-5 as described in Internet Draft "IP Prefix Advertisement in E-VPN", incorporated herein by reference in its entirety, with the proper ESI set. Thus, PE1 is configured to advertise host prefixes that it receives from the CE 216 to PEs2-4. The DF SPE may be configured to use EVPN route type-5 communication indicating appropriate ESI. Since the SPEs PE1-PE4 are running in EVPN single-active redundancy mode, the SPEs would advertise an Ethernet Auto-Discovery (AD) route per vES with the single-active flag set as provided by RFC 7432, incorporated herein by reference in its entirety. Furthermore, the DF PE is configured to set the "Primary" bit in the L2 extended community and the standby PE set the "Backup" bit in that extended community.

Each of the remote PEs, PEr 230 in FIG. 2, receives the advertisements of the PE1 as well, via a Routing Reflector (RR) 240, learns the host prefixes of the CE 216, and associates them with the ESI indicated in the advertisement, and in turn to PE1, since PE1 is the DF for that ESI. Each of the remote PEs 230 would maintain an association of the learned host prefixes and corresponding ESIs and use respective advertising PE (DF SPE) as the next-hop for forwarding traffic to hosts identified by the stored host prefixes.

Other SPEs in the same Redundancy Group as the advertising PE will receive the same EVPN route type-5 advertisement as the remote PEs, and will recognize the associated ESI as a locally attached vES. This information will be used in the case of failure to provide a backup path to the CE 216: other PEs in the redundancy group (PE2, PE3, and PE4) receiving the same route type-5 advertisement from PE1 and realizing that it is associated with the ESI shared with PE1 effectively synchronizes Virtual Routing and Forwarding (VRF) tables among all of the PEs in the Redundancy Group. Thus, the SPEs in the same Redundancy Group may synchronize their IP-VRFs among themselves. As is well-known, VRF refers to a technology that allows multiple instances of a routing table to co-exist within the same router at the same time. Because the routing instances are independent, the same or overlapping IP addresses can be used without conflicting with each other.

On SPEs, VLAN sub-interfaces may be configured as directly attached sub-interfaces to the VRF. EVPN DF election status procedure also determines which IP-VRFs on which SPEs have the DF status.

Furthermore, the SPEs in the Redundancy Group may be configured to synchronize their ARP caches through the EVPN route type-2 advertisements from the DF PE, as described in RFC 7432, incorporated herein by reference in its entirety. Other PEs in the redundancy group (PE2, PE3, and PE4) receiving the same route type-2 advertisement from PE1 effectively synchronizes Address Resolution Protocol (ARP) caches among PEs in the Redundancy Group. As is well-known, ARP refers to a telecommunication protocol used for resolution of OSI L3 addresses (i.e. network layer addresses) into OSI L2 addresses (i.e., data link layer addresses). Converting a network layer address, such as e.g. an IPv4 address, to a physical address such as e.g. an Ethernet address, also referred to as a MAC address, provides a critical function in multiple-access networks. While details of certain embodiments of the present disclosure are described with reference to ARP, i.e. an IPv4 mechanism, these teachings are equally applicable, with modifications that would be apparent to a person of ordinary skill in the art based on the descriptions provided herein, to Neighbor Discovery Protocol (NDP) cache in IPv6 neighbor discovery.

On the SPEs, the pseudowires from the Access PEs are terminated onto VRFs, such that all pseudowires within a given redundancy set terminate on a single IP endpoint on the SPEs. To achieve this, the SPEs in a given Redundancy Group may be configured with the same Anycast IP and MAC addresses on the virtual (sub)interface corresponding to the VRF termination point. The SPEs of the Redundancy Group may then be referred to as a single Anycast Group.

Using EVPN-VPWS in Access Network

In some embodiments, EVPN-VPWS can be used instead of pseudowires in the MPLS access network, in that case all EVPN-VPWS service instances associated with a given CE are considered collectively as a Virtual Ethernet Segment (vES).

The elected DF SPE is configured to set the Primary bit in the L2 attributes extended community associated with the EVPN-VPWS service instance Ethernet A-D route, corresponding to the vES. The non-DF SPEs are configured to set the Backup bit in the L2 attributes extended community associated with the EVPN-VPWS service instance Ethernet A-D route, corresponding to the vES.

Just as with pseudowires described above, only the DF SPE has its access EVPN-VPWS service instance in Active state, and thus establishes an eBGP session with the CE and receive control and data traffic. Also as described above, the DF SPE advertises host prefixes that it receives, from the CE over the eBGP session, to other PEs in the EVI using EVPN route type-5, with the proper ESI set. Remote PEs learn the host prefixes and associate them with the ESI, using the advertising PE as the next-hop for forwarding.

Failure Scenarios According to Proposed Solution

Pseudowire Failure

According to some embodiments of the present disclosure, the active (i.e. DF) SPE can proactively monitor the health of the primary pseudowire by using a pseudowire Operations Administration and Maintenance (OAM) mechanism such as e.g. Virtual Circuit Connectivity Verification-Bidirectional Forwarding Detection (VCCV-BFD), as described in RFC 6718. As such, the DF SPE can detect the failure of the primary pseudowire, and react by withdrawing both the Ethernet Segment route as well as the Ethernet A-D route associated with the vES. Note that the SPE advertises the Ethernet A-D route per vES granularity as well as the Ethernet A-D per EVI. The withdrawal of the Ethernet Segment route serves as an indication to the backup SPE to go active (i.e. act as a backup DF that becomes the DF in case the current DF SPE is no longer DF), and activate its pseudowires to the Access PE. The withdrawal of the Ethernet A-D route triggers a "mass withdraw" on the remote PEs 230: these PEs adjust their next-hop associated with the prefixes that were originally advertised by the failed PE to point to the "backup path" per RFC 7432. This provides relatively fast convergence because only a single message per Ethernet Segment is required for the remote PEs to switch over to the backup path irrespective of how many prefixes were learnt from the CE over the pseudowire. Also, no synchronization of VRF or ARP/NDP tables is required between the primary SPE and its backup SPE during the failover, because these tables were already populated ahead of time during the original EVPN route advertisements.

As a result of the pseudowire failure, the eBGP session between the CE and the original DF PE will time out. In an embodiment, that SPE may be configured to start a timer in order to defer withdrawing the EVPN type-5 and type-2 routes that it had advertised for the prefixes learnt over the session from the CE. As the backup pseudowire to the backup DF PE goes active, the eBGP session will be re-established by the CE with the backup PE. Since both PEs (i.e. the previous DF SPE and the new DF SPE) share the same Anycast IP and MAC addresses, the CE advantageously does not recognize that it is in communication with a different PE.

To minimize disruption in data forwarding on the CE and the backup PE, the non-stop forwarding feature such as BGP Graceful Restart may be used. Since the end-point IP address has not changed, this eBGP session handover between the primary SPE and the backup SPE, looks like a eBGP session flap with respect to the CE. Thus, the CE continues its packet forwarding operation in data-plane while synchronizing its control-plane with the backup SPE.

EVPN VPWS Service Instance Failure

The failure scenario for an EVPN VPWS in similar to the pseudowire failure scenario described in the previous section. The failure detection of an EVPN service instance can be performed via OAM mechanisms such as VCCV-BFD and upon such failure detection, the switch over procedure to the backup SPE is analogous to the one described above.

PE Node Failure

In the case of PE node failure, the procedure is similar to the steps described above, albeit that EVPN route withdrawals are performed by the Route Reflector 240 instead of the PE.

Failover Procedure

With reference to FIG. 2 where PE1 is the original DF SPE, failover procedure may be described as follows.

Each CPE 216 is basically represented as an Virtual Ethernet Segment in EVPN.

When a pseudowire on PE1 fails, or PE1 fails, or the entire site goes down, this translates into withdraw of two routes corresponding to that Ethernet Segment (to that CPE). These two EVPN routes are: Ethernet A-D per ES route and Ethernet Segment (ES) route. The withdraw of ES route results in a certain backup PE becoming active. The withdraw of Ethernet A-D per ES route, also known as "mass withdraw" route, results in remote PEs 230 adjusting their PIC pointer to the backup PE via a single message per ES.

In case of a pseudowire failure, the withdraw is initiated by the PE1. In case of PE1 failure or site failure, the withdraw is initiated by the RR 240.

Such convergence is relatively fast for a number of reasons. One is that only a single message per ES results in remote PEs to switch over to the backup PE regardless of how many subnets (VLANs) are supported by that pseudowire and how many prefixes were behind each of those VLANs. Another reason is that no synchronization of IP-VRFs and ARP/NDP tables between primary PE and backup PE is needed during this failover because this synchronization was already performed ahead of time. In addition, data forwarding should be interrupted very little because of PIC function on remote PEs, ready RIBs/FIBs on the backup PE, and non-stop forwarding using BGP Graceful Restart on the CPE.

Exemplary Methods

As the foregoing description illustrates, functionality of an L3VPN service system proposed herein includes steps performed by various entities—such as e.g. at least the DF SPE, one or more of the backup SPEs, and one or more of the remote SPEs. FIGS. 3-5 summarize operations carried out by each one of these nodes. Steps of the methods shown in FIGS. 3-5 are described with reference to the elements and to the exemplary configuration of the network environment 200, and with reference to the scenario described above where PE1 is the original DF PE device and PE2 is the backup PE device that is configured to become the new DF SPE in case of failover. Based on the descriptions provided herein, these steps could be easily extended to other configurations and other network environments, all of which are within the scope of the present disclosure.

FIG. 3 is a flow diagram of a method 300 for assisting provision of an L3VPN service using EVPN from a perspective of a DF SPE, according to some embodiments of the present disclosure.

The method may begin with an election of a DF PE device (i.e. primary PE), out of a Redundancy Group of SPE devices (box 302), using e.g. EVPN DF election mechanism to select primary vs backup pseudowires. All of the one or more VLANs that may be carried by a single primary pseudowire will also have the DF status. The rest of the SPE devices in the Redundancy Group are backup devices. An order may be set within them as to which one of them becomes the new DF PE device in case of failover of the old DF PE device—e.g. that if PE1 is no longer the DF PE, then PE2 becomes the next DF PE.

The elected DF device PE1 can then establish an eBGP session with the CE device 216 (box 304). The same Anycast overlay IP address/MAC address can be configured across all SPEs of the Redundancy Group (i.e. PE1-4). At any particular time, not more than one of the PEs, the DF SPE device, has the eBGP session with the CE device and receives control and data traffic from the CE device.

The elected DF device PE1 receives BGP advertisements from the CE 216 over the eBGP session between PE1 and CE 216 (box 306). The BGP advertisements carry host prefixes of the CE device 216. The DF PE1 stores the host prefixes.

The elected DF device PE1 advertises the host prefixes received from the CE 216, using e.g. EVPN route-5 messages, indicating that the host prefixes are for the CE 216 (and not for the PE1) and that PE1 is the primary/DF PE device for reaching the CE 216 (box 308). PE1 also includes its ESI in the advertisements. These advertisements enable synchronization of VRF tables among PEs in the Redundancy Group.

In addition, PE1 advertises information that allows synchronization of ARP/NDP cache tables among all SPEs in the Redundancy Group (not shown in FIG. 3), e.g. using EVPN route-2 messages.

FIG. 4 is a flow diagram of a method 400 for assisting provision of an L3VPN service using EVPN from a perspective of a non-DF (i.e. a backup) SPE, according to some embodiments of the present disclosure.

The method may begin with a non-DF SPE, e.g. PE2, receiving advertisements from the DF PE device PE1 sent in box 308 of FIG. 3, i.e. advertisements containing host prefixes that PE1 received from the CE 216 and an indication that the prefixes are for the CE 216 (box 402). The non-DF SPE stores the host prefixes together with an association that the prefixes are for the CE device 216. In case this non-DF SPE becomes the DF SPE later, it can activate its local interface to the CE 216 to and use the stored information to reach any of the host prefixes.

The non-DF SPE, in turn, also advertises the host prefixes received in box 402, e.g. using EVPN route-5 messages, indicating that the host prefixes are for the CE 216 (and not for the non-DF PE) and that the non-DF PE is the backup DF PE device for reaching the CE 216 (box 404). The non-DF PE also includes its ESI in the advertisements. These advertisements reach the remote PEs 230 and let those PEs know which PE device of the Redundancy Group to reach in case there is a failure associated with the current DF PE device.

When the pseudowire on the DF PE device fails, or the DF PE device fails, or the entire site goes down, two routes are withdrawn for the ES of the DF PE. Withdraw of one of these routes, ES route, results in the backup PE becoming active, i.e. the non-DF PE device becomes active, the new DF PE, for the CE device 216 (box 406). The new DF PE activates its local interface to the CE device 216. The CE device 216 will re-establish the eBGP session, e.g. after a certain timeout time for timeout with PE1, but this time with the new DF PE device PE2. Because both PE1 and PE2 have the same anycast IP/MAC address, they appear as a single device to the CE 216. Because PE2 already contains host prefixes that were advertised by the CE 216 to PE1 (per box 402 above), these host prefixes do not need to be re-advertised for PE2 just because there was a failure with PE1. In addition, the ARP/NDP tables of PE1 and pE2 devices are synchronized as a result of the previous DF PE device PE1 sending messages containing information that allows this synchronization. Now PE2 receives control and data traffic from the CE 216 and performs actions of the DF SPE as described above, e.g. in boxes 306 and 308.

FIG. 5 is a flow diagram of a method 500 for assisting provision of an L3VPN service using EVPN from a perspective of a remote PE device, according to some embodiments of the present disclosure.

The method 500 may begin with a PEr device 230 receiving advertisements from the DF PE device PE1 sent in box 308 of FIG. 3, i.e. advertisements containing host prefixes that PE1 received from the CE 216 and an indication that the prefixes are for the CE 216 (box 502).

PEr device 230 also receives advertisements from each of the one or more non-DF PE devices sent in box 404 of FIG. 4, i.e. advertisements containing host prefixes that non-DF PE devices received from the DF PE device and an indication that the prefixes are for the CE 216 (box 504).

The Per device 230 stores the host prefixes together with an association that the prefixes are for the CE device 216 and with an indication of the current DF PE device (per messages of box 502) and of the current backup PE device(s) (per messages of box 504) for the CE device. PEr device 230 sends traffic destined to any one of the hosts identified by these prefixes via the PE device 220 that is indicated as the current primary/DF (box 506).

When the pseudowire on the DF PE device fails, or the DF PE device fails, or the entire site goes down, PEr device 230 receives ES withdraw message (box 508). As previously described herein, two routes are withdrawn for the ES of the DF PE in case of failover, where withdraw of one of these routes, ES route, results in the backup PE becoming active, i.e. the non-DF PE device becomes active, the new DF PE, for the CE device 216. Withdraw of another one of these routes, Ethernet A-D per ES route, results in PEr 230 adjusting its PIC pointer to point to the backup PE device which now becomes the new DF PE device, e.g. PE2. PEr 230 knows that PE2 is the new DF SPE for the CE 216 because of the association between host prefixes and DF vs non-DF PE devices for the CE device that was assembled in boxes 502 and 504.

PEr device 230 now sends traffic destined to any one of the hosts identified by these prefixes via the backup PE device PE2 that has now become the new DF PE device (box 510).

Exemplary Devices

FIG. 6 illustrates an example network device 600 suitable for implementing various embodiments of the present disclosure, e.g. embodiments related to assisting provision of L3VPN service using EVPN. In various embodiments, the network device 600 could be any one of or could be communicatively connected to in order to configure any one of the PE devices described herein, e.g. the CE device 216, any one of SPE devices 220 or any one of remote PE devices 230 shown in FIG. 2, with functionality described herein with reference to these devices.

As shown in FIG. 6, the network device 600 includes a master central processing unit (CPU) 610, interfaces 620, and a bus 630 (e.g., a PCI bus). When acting under the control of appropriate software or firmware, the CPU 610 is responsible for executing packet management, error detection, and/or routing or forwarding functions. The CPU 610 can accomplish all these functions under the control of software including an operating system and any appropriate applications software. CPU 610 may include one or more processors 614 such as a processor from the Motorola family of microprocessors or the MIPS family of microprocessors. In an alternative embodiment, processor 614 is specially designed hardware for controlling the operations of network device 600. In a specific embodiment, a memory 612 (such as non-volatile RAM and/or ROM) also forms part of CPU 610. However, there are many different ways in which memory could be coupled to the system.

The interfaces 620 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 610 to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 612) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIGS. 7 and 8 illustrate example systems, according to some embodiments of the present disclosure. The more appropriate embodiment will be apparent to those of ordinary skill in the art when practicing the present technology.

Persons of ordinary skill in the art will also readily appreciate that other system embodiments are possible.

Systems such as the ones shown in FIGS. 7 and 8 are also suitable for implementing various embodiments of the present disclosure, e.g. embodiments related to assisting provision of L3VPN service using EVPN. In various embodiments, such systems could be any one of or could be communicatively connected to in order to configure any one of the PE devices described herein, e.g. the CE device 216, any one of SPE devices 220 or any one of remote PE devices 230 shown in FIG. 2, with functionality described herein with reference to these devices.

FIG. 7 illustrates a conventional system bus computing system architecture 700 wherein the components of the system are in electrical communication with each other. Exemplary system 700 includes a processing unit (CPU or processor) 702, communicatively connected to a system bus 706. The system bus 706 couples various system components to the processor 702, the system components including e.g. a system memory 708, a read only memory (ROM) 710, and a random access memory (RAM) 712. The system 700 can include a cache 704 of high-speed memory connected directly with, in close proximity to, or integrated as part of the processor 702. The system 700 can copy data from the memory 708 and/or the storage device 714 to the cache 704 for quick access by the processor 702. In this way, the cache 704 can provide a performance boost that avoids processor 702 delays while waiting for data. These and other modules can control or be configured to control the processor 702 to perform various actions. Other system memory 708 may be available for use as well. The memory 708 can include multiple different types of memory with different performance characteristics. The processor 702 can include any general purpose processor and a hardware module or software module, such as module 1 716, module 2 718, and module 3 720 stored in the storage device 714, configured to control the processor 702 as well as a special-purpose processor where software instructions are incorporated into the actual processor design. The processor 702 may essentially be a completely self-contained computing system, containing multiple cores or processors, a bus, memory controller, cache, etc. A multi-core processor may be symmetric or asymmetric.

To enable user interaction with the computing device 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing device 700. The communications interface 726 can generally govern and manage the user input and system output. There is no restriction on operating on any particular hardware arrangement and therefore the basic features here may easily be substituted for improved hardware or firmware arrangements as they are developed.

Storage device 714 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 712, read only memory (ROM) 710, and hybrids thereof.

The storage device 714 can include software modules 716, 718, 720 for controlling the processor 702. Other hardware or software modules are contemplated. The storage device 714 can be connected to the system bus 706. In one aspect, a hardware module that performs a particular function can include the software component stored in a computer-readable medium in connection with the necessary hardware components, such as the processor 702, bus 706, display 724, and so forth, to carry out the function.

FIG. 8 illustrates an example computer system 800 having a chipset architecture that can be used in executing the described method and generating and displaying a graphical user interface (GUI). Computer system 800 is an example of computer hardware, software, and firmware that can be used to implement the disclosed technology. System 800 can include a processor 802, representative of any number of physically and/or logically distinct resources capable of executing software, firmware, and hardware configured to perform identified computations. Processor 802 can communicate with a chipset 804 that can control input to and output from processor 802. In this example, chipset 804 outputs information to output 806, such as a display, and can read and write information to storage device 808, which can include magnetic media, and solid state media, for example. Chipset 804 can also read data from and write data to RAM 810. A bridge 812 for interfacing with a variety of user interface components 814 can be provided for interfacing with chipset 804. Such user interface components 814 can include a keyboard, a microphone, touch detection and processing circuitry, a pointing device, such as a mouse, and so on. In general, inputs to system 800 can come from any of a variety of sources, machine generated and/or human generated.

Chipset 804 can also interface with one or more communication interfaces 816 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 802 analyzing data stored in storage 808 or 810. Further, the machine can receive inputs from a user via user interface components 814 and execute appropriate functions, such as browsing functions by interpreting these inputs using processor 802.

It can be appreciated that example systems 700 and 800 can have more than one processor 702, 802, or be part of a group or cluster of computing devices networked together to provide greater processing capability.

SELECTED EXAMPLES

Set of Examples A (Perspective of DF SPE)

Example A1 provides a computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode. The method includes establishing a communication session between said CE device and a provider edge (PE) device elected, out of said plurality of PE devices, to be a single designated forwarder (DF) for said CE device (DF PE device), receiving at said DF PE device from said CE device, over said communication session, one or more messages including host Internet Protocol (IP) prefixes of hosts reachable via said CE device; and_sending, by said DF PE device, one or more route advertisement messages advertising the host IP prefixes received at said DF PE device from said CE device, each route advertisement message including an indication of said CE device (thus providing an indication that said host IP prefixes contained in the route advertisement messages are for hosts reachable via said CE device).

Example A2 provides the method according to Example A1, where the communication session between said CE device and said DF PE is an external Border Gateway Protocol (eBGP) session and the one or more messages received at said DF PE device from said CE device include BGP update messages.

Example A3 provides the method according to Example A1, where the communication session between said CE device and said DF PE is an Interior Gateway Protocol (IGP) session and the one or more messages received at said DF PE device from said CE device include IGP update messages.

Example A4 provides the method according to Example A1, where the one or more route advertisement messages are EVPN route type-5 messages as described e.g. in Internet Draft "IP Prefix Advertisement in E-VPN".

Example A5 provides the method according to Example A1, where each route advertisement message further includes an Ethernet Segment Identification (ESI) for a set of Ethernet communication links between said CE device and each of the plurality of PE devices.

Example A6 provides the method according to Example A1, where each route advertisement message further includes an indication that the DF PE device is the DF for said CE device. Each route advertisement message may be advertised from the DF PE device.

Example A7 provides the method according to Example A1, where each of said plurality of PE devices are configured with the same anycast overlay address on a VLAN interface across all PE devices in the redundancy group.

Example A8 provides the method according to Example A1, further including sending, by said DF PE device, one or more address resolution messages including information for synchronizing Address Resolution Protocol (ARP) tables or Neighbor Discovery Protocol (NDP) tables of said plurality of PE devices.

Example A9 provides the method according to Example A8, where the one or more address resolution messages are EVPN route type-2 messages as described e.g. in RFC 7432.

Set of Examples B (Perspective of Non-DF SPE)

Example B1 provides a computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode. The method includes receiving, at a provider edge (PE) device not elected, out of said plurality of PE devices, to be a single designated forwarder (DF) for said CE device (non-DF PE device), from a PE device elected, out of said plurality of PE devices, to be the single DF for said CE device (DF PE device), one or more route advertisement messages advertising host Internet Protocol (IP) prefixes; and determining that each route advertisement message includes an indication that the host IP prefixes are for hosts to be reached via said CE device.

Example B2 provides the method according to Example B1, where storing the association between the host IP prefixes and the local interface includes indicating the local interface as a NEXT_HOP for the traffic received at the non-DF PE device and destined to the hosts identified by the host IP prefixes of the one or more route advertisement messages.

Example B3 provides the method according to Example B1, where the one or more route advertisement messages are EVPN route type-5 messages as described e.g. in Internet Draft "IP Prefix Advertisement in E-VPN".

Example B4 provides the method according to Example B1, further including receiving traffic destined to one or more hosts of the hosts identified by the host IP prefixes of the one or more route advertisement messages; using the stored association to determine that the received traffic is to be sent to the one or more hosts via the local interface of said non-DE PE device to said CE device; and sending the received traffic to said CE device via the local interface of said non-DE PE device to said CE device.

Example B5 provides the method according to Example B1, where the local interface is identified by extracting, from each route advertisement message, an Ethernet Segment Identification (ESI) for a set of Ethernet communication links between said CE device and each of the plurality of PE devices, determining that the extracted ESI is shared between said DF PE device and said non-DF PE device, and identifying an interface of an Ethernet communication link, of said set of Ethernet communication links identified by the extracted ESI, between said non-DF PE device and said CE device as the local interface of said non-DE PE device to said CE device.

Example B6 provides the method according to Example B1, further including sending, by said non-DF PE device, to one or more remote PE devices, an indication notifying the one or more remote PE devices that the non-DF PE device is not elected to be the DF for said CE device.

Example B7 provides the method according to Example B6, where the indication to the one or more remote PE devices includes or is included in an EVPN route type-1 message.

Example B8 provides the method according to Example B1, where each of said plurality of PE devices are configured with the same anycast overlay address on a VLAN interface across all PE devices in the redundancy group.

Example B9 provides the method according to Example B1, further including receiving, at said non-DF PE device, from said DF PE device, one or more address resolution messages including information for synchronizing Address Resolution Protocol (ARP) tables or Neighbor Discovery Protocol (NDP) tables of said plurality of PE devices.

Example B10 provides the method according to Example B9, where the one or more address resolution messages are EVPN route type-2 messages as described e.g. in RFC 7432.

Example B11 provides the method according to Example B1, further including receiving, at the non-DF PE device, an indication that said non-DF PE device is to become the DF for said CE device; and, in response to receiving said indication, activating the local interface of said non-DE PE device to said CE device and establishing a communication session between said CE device and said non-DF PE device.

Example B12 provides the method according to Example B11, where said indication includes or is included in an EVPN route type-4 message.

Example B13 provides the method according to Example B11, further including sending, by said non-DF PE device, to one or more remote PE devices, one or more route advertisement messages advertising the host prefixes received at said non-DF PE device from said CE device upon activation of said local interface.

Example B14 provides the method according to Example B11, further including sending traffic destined to the hosts identified by the host prefixes of the one or more route advertisement messages via the local interface to said CE device.

In another example, the method according to Example B11 may further include re-establishing BGP session between said CE device and the backup PE device while maintaining host prefix routes in the forwarding tables of both the CE device and the backup PE device.

In yet another example, the method according to Example B11 may further include re-establishing BGP session between the CE device and the backup PE device and synching up routing tables of both the CE device and the backup PE device via exchange of BGP messages between the CE device and the said backup PE device.

Set of Examples C (Perspective of PEr)

Example C1 provides a computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode. The method includes receiving, at a remote provider edge device (PEr), from a PE device elected, out of said plurality of PE devices, to be the single designated forwarder (DF) for said CE device (DF PE device), one or more route advertisement messages advertising host Internet Protocol (IP) prefixes and indicating that said DF PE device is the DF for said CE device; receiving, at said PEr device, from a PE device not elected, out of said plurality of PE devices, to be the single DF for said CE device (non-DF PE device), an indication that said non-DF PE device is a backup PE device for said CE device (i.e. an indication that said non-DF PE device is not elected to be the DF for said CE device); and storing an association between said host IP prefixes, said CE device, an identification of said DF PE device, and an identification of said non-DF PE device.

Example C2 provides the method according to Example C1, further including receiving traffic destined to one or more hosts of the hosts identified by the host prefixes of the one or more route advertisement messages; using the stored association to determine that the received traffic is to be sent to the one or more hosts via said DF PE device; and sending the received traffic to said DF PE device.

Example C3 provides the method according to Example C1, further including receiving an indication that said DF PE device is no longer the DF for said CE device.

Example C4 provides the method according to Example C3, further including after receiving the indication that said DF PE device is no longer the DF for said CE device, receiving traffic destined to one or more hosts of the hosts identified by the host prefixes of the one or more route advertisement messages; using the stored association to determine that the received traffic is to be sent to the one or more hosts via said non-DF PE device; and sending the received traffic to said non-DF PE device.

Example C5 provides the method according to Example C1, where the one or more route advertisement messages include or are included in EVPN route type-5 messages.

Example C6 provides the method according to Example C1, where the indication that said non-DF PE device is the backup PE device for said CE device includes or is included in an EVPN route type-1 message.

Further Examples provides a system configured to carry out the method according to any one of the preceding Examples. The system may include at least one memory element configured to store computer executable instructions, and at least one processor coupled to the at least one memory element and configured, when executing the instructions, to carry out the method according to any one of the preceding Examples.

Further Examples provides a computer-readable storage medium, preferably non-transitory, encoding logic that include instructions for execution that, when executed by a processor, are operable to perform the method according to any one of the preceding Examples.

Variations and Implementations

It is important to note that the steps in the appended diagrams illustrate only some of the possible scenarios and patterns that may be executed by, or within, the network environment shown in FIGUREs. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the network environment shown in FIGUREs in that any suitable arrangements, chronologies, configurations, and timing mechanisms may be provided without departing from the teachings provided herein.

As used herein in this Specification, the term 'network element', such as e.g. the CE device 216, or any of the SPEs 220 and any of the remote Pes 230, is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to solutions described herein. This may be inclusive of appropriate algorithms and communication protocols that allow for the effective exchange of data or information.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims may be presented in single dependency format in the style used before the USPTO, it should be understood that any claim can depend on and be combined with any preceding claim of the same type unless that is clearly technically infeasible.

What is claimed is:

1. A computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode, the method comprising:
  establishing a communication session between said CE device and a provider edge (PE) device elected, out of said plurality of PE devices, to be a designated forwarder (DF) for said CE device (DF PE device), wherein each of said plurality of PE devices are configured with a same anycast overlay address;
  receiving at said DF PE device from said CE device, over said communication session, one or more messages comprising host Internet Protocol (IP) prefixes reachable via said CE device;
  sending, by said DF PE device, one or more route advertisement messages advertising the host IP prefixes received at said DF PE device from said CE device, each route advertisement message comprising an indication of said CE device;
  detecting, by said DF PE device, a failure of said communication session between the DF PE device and said CE device; and
  in response to the failure of said communication session, withdrawing a pseudowire used by said communication session, wherein withdrawing the pseudowire triggers one of the other non-DF PE devices to establish a second communication session with said CE device.

2. The method according to claim 1, wherein the communication session between said CE device and said DF PE is an external Border Gateway Protocol (eBGP) session and the one or more messages received at said DF PE device from said CE device comprise BGP update messages.

3. The method according to claim 1, wherein the communication session between said CE device and said DF PE is an Interior Gateway Protocol (IGP) session and the one or more messages received at said DF PE device from said CE device comprise IGP update messages.

4. The method according to claim 1, wherein the one or more route advertisement messages are EVPN route type-5 messages.

5. The method according to claim 1, wherein each route advertisement message further comprises an Ethernet Segment Identification (ESI) for a set of Ethernet communication links between said CE device and each of the plurality of PE devices.

6. The method according to claim 1, wherein each route advertisement message further comprises an indication that the DF PE device is the DF for said CE device.

7. The method according to claim 1, further comprising:
  sending, by said DF PE device, one or more address resolution messages comprising information for synchronizing Address Resolution Protocol (ARP) tables or Neighbor Discovery Protocol (NDP) tables of said plurality of PE devices.

8. The method according to claim 7, wherein the one or more address resolution messages are EVPN route type-2 messages.

9. A computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode, the method comprising:
  receiving, at a provider edge (PE) device not elected, out of said plurality of PE devices, to be a designated forwarder (DF) for said CE device (non-DF PE device), from a PE device elected, out of said plurality of PE devices, to be the DF for said CE device (DF PE device), one or more route advertisement messages advertising host Internet Protocol (IP) prefixes, wherein each of said plurality of PE devices are configured with a same anycast overlay address;
  determining that each route advertisement message comprises an indication that the host IP prefixes are for hosts to be reached via said CE device;
  storing an association between the host IP prefixes and a local interface of the PE device not elected;
  receiving, at the non-DF PE device, an indication that said non-DF PE device is to become the DF for said CE device in response to said PE device withdrawing a pseudowire used by a first communication session between said PE device and said CE device; and
  in response to receiving said indication, establishing a second communication session between said non-DF PE device and said CE device.

10. The method according to claim 9, wherein storing the association between the host IP prefixes and the local interface comprises indicating the local interface as a NEXT HOP for the traffic received at the non-DF PE device and destined to the hosts identified by the host IP prefixes of the one or more route advertisement messages.

11. The method according to claim 9, further comprising:
  receiving traffic destined to one or more hosts of the hosts identified by the host IP prefixes of the one or more route advertisement messages;
  using the stored association to determine that the received traffic is to be sent to the one or more hosts via the local interface of said non-DE PE device to said CE device; and
  sending the received traffic to said CE device via the local interface of said non-DE PE device to said CE device.

12. The method according to claim 9, wherein the local interface is identified by:
  extracting, from each route advertisement message, an Ethernet Segment Identification (ESI) for a set of Ethernet communication links between said CE device and each of the plurality of PE devices,
  determining that the extracted ESI is shared between said DF PE device and said non-DF PE device, and
  identifying an interface of an Ethernet communication link, of said set of Ethernet communication links identified by the extracted ESI, between said non-DF PE device and said CE device as the local interface of said non-DE PE device to said CE device.

13. The method according to claim 9, further comprising:
  sending, by said non-DF PE device, to one or more remote PE devices, an indication notifying the one or more remote PE devices that the non-DF PE device is not elected to be the DF for said CE device.

14. The method according to claim 9, wherein said indication comprises or is included in an EVPN route type-4 message.

15. The method according to claim 9, further comprising:
  sending, by said non-DF PE device, to one or more remote PE devices, one or more route advertisement messages advertising the host IP prefixes received at said non-DF PE device from said CE device upon activation of a local interface of said non-DF PE device.

16. A computer-implemented method for assisting provision of a Layer 3 Virtual Private Network (L3VPN) service using Ethernet VPN (EVPN) for a customer edge (CE) device multi-homed to a plurality of provider edge (PE) devices and operating in a single-active redundancy mode, the method comprising:

receiving, at a remote provider edge device (PEr), from a PE device elected, out of said plurality of PE devices, to be the designated forwarder (DF) for said CE device (DF PE device) over a first communication session, one or more route advertisement messages advertising host Internet Protocol (IP) prefixes and indicating that said DF PE device is the DF for said CE device, wherein each of said plurality of PE devices are configured with a same anycast overlay address;

receiving, at said PEr device, from a PE device not elected, out of said plurality of PE devices, to be the DF for said CE device (non-DF PE device), an indication that said non-DF PE device is a backup PE device for said CE device;

storing an association between said host IP prefixes, said CE device, an identification of said DF PE device, and an identification of said non-DF PE device;

receiving an indication that said DF PE device is no longer the DF for said CE device when said DF PE device withdraws a pseudowire used in said first communication session between said DF PE device and said CE device;

in response to receiving said indication, withdrawing a first connection between said PEr device and said DF PE device; and establishing a second connection between said PEr device and said non-DF PE device after said non-DF PE device establishes a second communication session between said non-DF PE device and said CE device.

17. The method according to claim 16, further comprising:

receiving traffic destined to one or more hosts of the hosts identified by the host IP prefixes of the one or more route advertisement messages;

using the stored association to determine that the received traffic is to be sent to the one or more hosts via said DF PE device; and sending the received traffic to said DF PE device.

18. The method according to claim 16, further comprising:

after receiving the indication that said DF PE device is no longer the DF for said CE device, receiving traffic destined to one or more hosts of the hosts identified by the host IP prefixes of the one or more route advertisement messages;

using the stored association to determine that the received traffic is to be sent to the one or more hosts via said non-DF PE device; and sending the received traffic to said non-DF PE device.

19. The method according to claim 16, wherein the one or more route advertisement messages are EVPN route type-5 messages.

20. The method according to claim 16, wherein each route advertisement message further comprises an Ethernet Segment Identification (ESI) for a set of Ethernet communication links between said CE device and each of the plurality of PE devices.

* * * * *